(12) United States Patent
Jiang et al.

(10) Patent No.: US 10,033,732 B1
(45) Date of Patent: Jul. 24, 2018

(54) SYSTEMS AND METHODS FOR DETECTING CLONING OF SECURITY TOKENS

(71) Applicant: Symantec Corporation, Mountain View, CA (US)

(72) Inventors: Kevin Jiang, San Mateo, CA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 78 days.

(21) Appl. No.: 15/346,752

(22) Filed: Nov. 9, 2016

(51) Int. Cl.
*H04L 29/06* (2006.01)
*H04L 29/08* (2006.01)

(52) U.S. Cl.
CPC ...... *H04L 63/0838* (2013.01); *H04L 63/0846* (2013.01); *H04L 63/123* (2013.01)

(58) Field of Classification Search
CPC ............. H04L 63/0838; H04L 63/0846; H04L 63/123
USPC .............................................................. 726/6
See application file for complete search history.

(56) References Cited

U.S. PATENT DOCUMENTS

| | | | |
|---|---|---|---|
| 8,959,588 B1 | 2/2015 | Vijayan et al. | |
| 9,374,368 B1* | 6/2016 | Roth | H04L 63/0846 |
| 2008/0112596 A1* | 5/2008 | Rhoads | G06K 9/00577 |
| | | | 382/115 |
| 2008/0141364 A1* | 6/2008 | Skoric | G06F 21/31 |
| | | | 726/20 |
| 2009/0183248 A1* | 7/2009 | Tuyls | H04L 9/3278 |
| | | | 726/9 |
| 2011/0010543 A1* | 1/2011 | Schmidt | H04W 12/10 |
| | | | 713/168 |
| 2011/0307949 A1* | 12/2011 | Ronda | H04L 9/3213 |
| | | | 726/9 |
| 2011/0320811 A1* | 12/2011 | Ueda | G11B 20/00086 |
| | | | 713/158 |
| 2011/0320812 A1* | 12/2011 | Kuno | G06F 12/1458 |
| | | | 713/168 |

(Continued)

OTHER PUBLICATIONS

Kevin Jiang et al.; Systems and Methods for Preventing Loss of Possession Factors; U.S. Appl. No. 15/346,748, filed Nov. 9, 2016.

(Continued)

*Primary Examiner* — Haresh N Patel
(74) *Attorney, Agent, or Firm* — FisherBroyles, LLP (57) ABSTRACT

The disclosed computer-implemented method for detecting cloning of security tokens may include (i) logging, at an authentic security token, one-time-use security codes that are derived at the authentic security token from a shared secret that is stored at the authentic security token, (ii) logging, at a validation server, one-time-use security codes that are derived from the shared secret and received at the validation server, (iii) determining that the authentic security token has been cloned by determining that the one-time-use security codes logged at the validation server include at least one additional one-time-use security code that is not included in the one-time-use security codes logged at the authentic security token, and (iv) performing a security action in response to determining that the authentic security token has been cloned. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2012/0216269 A1* | 8/2012 | Yeung | ................... | G06F 21/10 |
| | | | | 726/11 |
| 2015/0100789 A1* | 4/2015 | Born | .................. | H04L 63/0876 |
| | | | | 713/170 |
| 2015/0237502 A1* | 8/2015 | Schmidt | ................ | H04W 12/10 |
| | | | | 726/7 |
| 2016/0085955 A1* | 3/2016 | Lerner | ................... | G06F 21/31 |
| | | | | 726/20 |
| 2016/0119331 A1* | 4/2016 | Sama | ................. | H04L 63/0838 |
| | | | | 726/6 |

OTHER PUBLICATIONS

Yufei Han, et al; Systems and Methods for Evaluating Infection Risks Based on Profiled User Behaviors; U.S. Appl. No. 15/188,956, filed Jun. 21, 2016.

Apple Pay; http://www.apple.com/apple-pay/, accessed Nov. 16, 2016; Sep. 9, 2014.

Install Google Authenticator; https://support.google.com/accounts/answer/1066447?hl=en, accessed Nov. 16, 2016; May 26, 2013.

Google Authenticator; https://play.google.com/store/apps/details?id=com.google.android.apps.authenticator2, accessed Nov. 16, 2016; May 2, 2012.

Authy; https://www.authy.com/product/, accessed Nov. 16, 2016; Mar. 10, 2016.

D. M'Raihi et al.; TOTP: Time-Based One-Time Password Algorithm; https://tools.ietf.org/html/rfc6238; May 2011.

* cited by examiner

SYSTEMS AND METHODS FOR DETECTING CLONING OF SECURITY TOKENS

BACKGROUND

Today, many mobile devices are used as security tokens and/or host security tokens. As such, these mobile devices may store shared secrets that are used to generate one-time-use security codes for various authentication and validation purposes such as multi-factor authentication, mobile purchases, electronic identification, and so on. Typically, these shared secrets are unique to each mobile device on which they are stored. For example, a unique virtual credit card may be associated with and stored to a specific mobile device to enable the mobile device to perform APPLE PAY transactions. Similarly, a shared secret may be associated with and stored to a specific mobile device to enable two-factor authentication (e.g., using a two-factor authentication system such as GOOGLE AUTHENTICATOR or AUTHY) to be performed via the mobile device.

Unfortunately, when a security token is temporarily out of an owner's possession (e.g., when a mobile device is surrendered for repairs or maintenance), a malicious party may extract a shared secret from the mobile device without the owner's knowledge. The malicious party may then use the extracted shared secret to clone the security token and use the cloned security token to generate security codes for authentication purposes. Since an authentic security token that has been cloned may be returned to the owner, the owner may be completely unaware of the authentic security token having been compromised. As such, the owner will likely be completely unaware of the malicious party's ability to impersonate the owner using the cloned security token. The instant disclosure, therefore, identifies and addresses a need for systems and methods for detecting cloning of security tokens.

SUMMARY

As will be described in greater detail below, the instant disclosure describes various systems and methods for detecting cloning of security tokens. In one example, a method for detecting cloning of security tokens may include (i) logging, at an authentic security token, one-time-use security codes that are derived at the authentic security token from a shared secret that is stored at the authentic security token, (ii) logging, at a validation server, one-time-use security codes that are derived from the shared secret and received at the validation server, (iii) determining that the authentic security token has been cloned by determining that the one-time-use security codes logged at the validation server include at least one additional one-time-use security code that is not included in the one-time-use security codes logged at the authentic security token, and (iv) performing a security action in response to determining that the authentic security token has been cloned. In some examples, the authentic security token may be the only security token on which the shared secret is intended to be used to generate one-time-use security codes.

In some examples, the method may further include transmitting, from the authentic security token to the validation server, a representation of the one-time-use security codes logged at the authentic security token, and the step of determining that the authentic security token has been cloned may be performed at the validation server. In at least one example, the representation of the one-time-use security codes logged at the authentic security token may include (i) the one-time-use security codes logged at the authentic security token and/or (ii) a timestamp of each of the one-time-use security codes logged at the authentic security token.

In some examples, the method may further include transmitting, from the validation server to the authentic security token, a representation of the one-time-use security codes logged at the validation server, and the step of determining that the authentic security token has been cloned is performed at the authentic security token. In at least one example, the representation of the one-time-use security codes logged at the validation server may include (i) the one-time-use security codes logged at the authentic security token, (ii) a timestamp of each of the one-time-use security codes logged at the authentic security token, and/or (iii) a hashed timestamp of each of the one-time-use security codes logged at the authentic security token.

In some examples, the one-time-use security codes may include one-time passwords and/or payment-transaction-specific dynamic security codes. In various examples, the step of performing the security action may include invalidating the shared secret and/or notifying an interested party of the authentic security token having been cloned.

In one embodiment, a system for detecting cloning of security tokens may include several modules stored in memory, including (i) a client-side logging module that logs, at an authentic security token, one-time-use security codes that are derived at the authentic security token from a shared secret that is stored at the authentic security token, (ii) a server-side logging module that logs, at a validation server, one-time-use security codes that are derived from the shared secret and received at the validation server, (iii) a determining module that determines that the authentic security token has been cloned by determining that the one-time-use security codes logged at the validation server include at least one additional one-time-use security code that is not included in the one-time-use security codes logged at the authentic security token, and (iv) a security module that performs a security action in response to determining that the authentic security token has been cloned. In some examples, the system may also include at least one physical processor that executes the client-side logging module, the server-side logging module, the determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) log, at an authentic security token, one-time-use security codes that are derived at the authentic security token from a shared secret that is stored at the authentic security token, (ii) log, at a validation server, one-time-use security codes that are derived from the shared secret and received at the validation server, (iii) determine that the authentic security token has been cloned by determining that the one-time-use security codes logged at the validation server include at least one additional one-time-use security code that is not included in the one-time-use security codes logged at the authentic security token, and (iv) perform a security action in response to determining that the authentic security token has been cloned.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting cloning of security tokens. As will be explained in greater detail below, by comparing (i) the one-time-use security codes that are derived at an authentic security token (e.g., an authentic hardware token or an authentic software token) from a shared secret that is stored at the authentic security token and known to a validation server with (ii) the one-time-use security codes that are derived from the shared secret and validated by the validation server, the systems and methods described herein may detect a discrepancy that indicates that (i) the authentic security token may have been cloned and (ii) a malicious party may be using a cloned security token to impersonate an owner of the authentic security token.

In addition, the systems and methods described herein may improve the functioning of a computing device that is or that hosts a security token by detecting when the computing device has been cloned thus increasing the computing device's security. These systems and methods may also improve the fields of multi-factor authentication, mobile purchases, and electronic identification by detecting when the devices involved in these fields have become compromised and are no longer secure. Embodiments of the instant disclosure may also provide various other advantages and features, as discussed in greater detail below.

Figure 1:
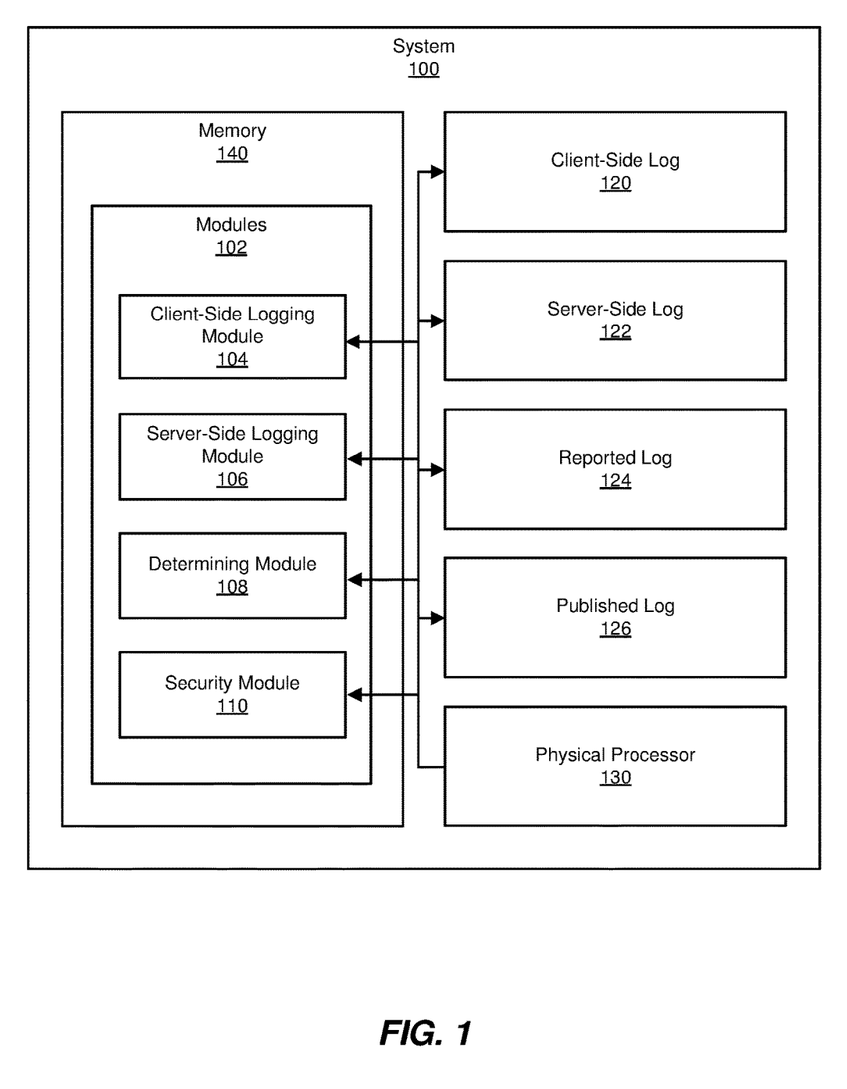
FIG. 1 is a block diagram of an example system for detecting cloning of security tokens.
Figure 2:
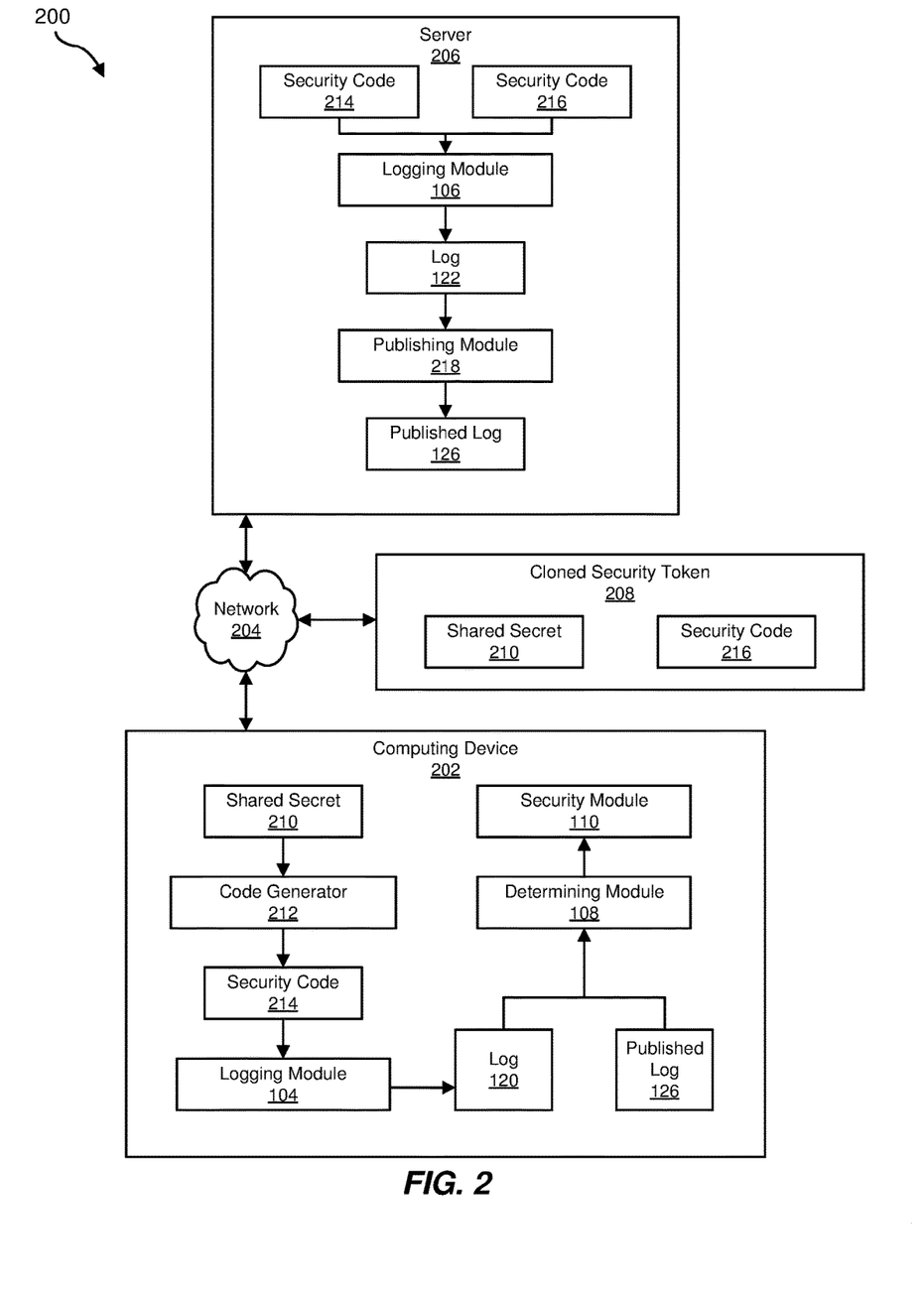
FIG. 2 is a block diagram of an additional example system for detecting cloning of security tokens.
Figure 3:
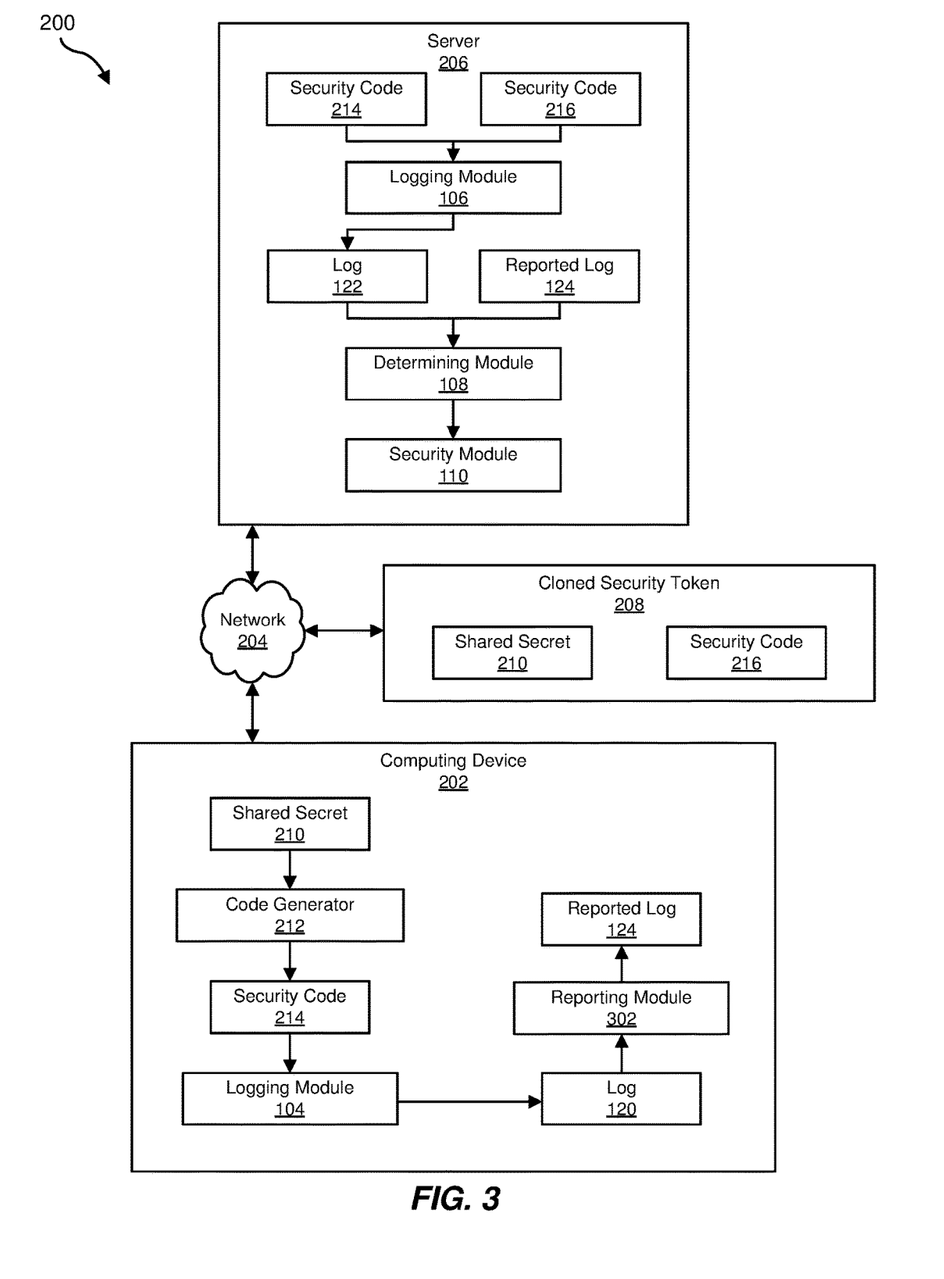
FIG. 3 is a block diagram of an additional example system for detecting cloning of security tokens.

The following will provide, with reference to FIGS. 1-3, detailed descriptions of example systems for detecting cloning of security tokens. Detailed descriptions of corresponding computer-implemented methods will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for detecting cloning of security tokens. As illustrated in this figure, example system 100 may include one or more modules 102 for performing one or more tasks. As will be explained in greater detail below, modules 102 may include a client-side logging module 104, a server-side logging module 106, a determining module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting cloning of security tokens. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more logs, such as client-side log 120, server-side log 122, reported log 124, and published log 126. Client-side log 120 generally represents any type or form of record of the one-time-use security codes that have been derived at an authentic security token from a shared secret stored at the authentic security token. Client-side log 120 may include a variety of information about the one-time-use security codes, such as the one-time-use security codes themselves, hashes of the one-time-use security codes, and/ or timestamps that indicate when the one-time-use security codes were derived and/or available to a user. Server-side log 122 generally represents any type or form of record of the one-time-use security codes that have been derived from a shared secret associated with an authentic security token and received at a validation server. Server-side log 122 may include a variety of information about the one-time-use security codes received at the validation server, such as the one-time-use security codes themselves, hashes of the one-time-use security codes, and/or timestamps that indicate when the one-time-use security codes were derived and/or received at the validation server.

Reported log 124 generally represents any type or form of information that is reported from an authentic security token to a validation server and that conveys some or all of the information contained in client-side log 120. Reported log 124 may include a variety of information about the one-time-use security codes recorded in client-side log 120, such as the one-time-use security codes themselves, hashes of the one-time-use security codes, and/or timestamps that indicate when the one-time-use security codes were derived and/or available to a user. Published log 126 generally represents any type or form of information that is published by a validation server to an authentic security token and that conveys some or all of the information contained in server-side log 122. Published log 126 may include a variety of information about the one-time-use security codes recorded in server-side log 122, such as the one-time-use security codes themselves, hashes of the one-time-use security codes, and/or timestamps that indicate when the one-time-use security codes were derived and/or received at the validation server.

Example system 100 in FIG. 1 may be implemented in a variety of ways. For example, all or a portion of example system 100 may represent portions of example system 200 in FIGS. 2 and 3. As shown in FIGS. 2 and 3, system 200 may include a computing device 202 in communication with a server 206 via a network 204. In one example, all or a portion of the functionality of modules 102 may be performed by computing device 202, server 206, and/or any other suitable computing system. Computing device 202 generally represents any type or form of computing device capable of reading computer-executable instructions and/or generating one-time-use security codes. In some examples, computing device 202 may represent a hardware token on which one-time-use security codes are generated using shared secret 210 and/or a computing device that hosts a software token that generates one-time-use security codes from shared secret 210. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of reading computer-executable instructions and/or receiving and validating one-time-use security codes. In at least one example, server 206 may represent a portion of a multi-factor authentication system that validates one-time-use security codes that are received from possession factors. In another example, server 206 may represent a portion of a payment network that validates payment transactions using dynamic security codes unique to each transaction. Additional examples of server 206 include, without limitation, security servers, application servers, web servers, storage servers, and/or database servers configured to run certain software applications and/or provide various security, web, storage, and/or database services. Although illustrated as a single entity in FIGS. 2 and 3, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

As shown in FIGS. 2 and 3, computing device 202 and server 206 may store a shared secret 210 from which one-time-use security codes may be derived. As used herein, the term "shared secret" generally refers to any shared cryptographic key that may be used to determine one-time-use security codes. The term "one-time-use security code," as used herein, generally refers to any value derived from a shared secret that is used for authentication or validation purposes and that is valid for a single use (e.g., valid for a single transaction or session login). Examples of one-time-use security codes include, without limitation, one-time passwords (e.g., passwords generated by two-factor authentication systems such as GOOGLE AUTHENTICATOR or AUTHY and/or passwords generated by a One-Time Password (OTP) algorithm such as the HMAC-based One-Time Password (HOTP) algorithm) and/or payment-transaction-specific dynamic security codes (e.g., unique payment-transaction values generated by mobile-payment or digital-wallet services such as APPLE PAY).

In general, one-time-use security codes are intended to be used to verify possession of a security token (e.g., a hardware token, a software token, or a payment token) from which the one-time-use security codes are generated. For this reason, a shared secret may be uniquely associated with a single authentic security token. As used herein, the term "authentic security token" generally refers to any hardware token or software token on which one-time-use security codes are intended to be generated from an associated shared key. In contrast, the term "cloned security token," as used herein, generally refers to any device or any software on which one-time-use security codes are not intended to be generated from a particular shared key that is associated with an authentic security token. As mentioned above, when a security token is temporarily out of an owner's possession (e.g., when a mobile device is surrendered to technical support for repairs or maintenance), a malicious party may extract a shared secret from the mobile device without the owner's knowledge. The malicious party may then use the extracted shared secret to clone the security token and use the cloned security token to generate security codes for authentication purposes. Since the authentic security token may be returned to the owner, the owner may be completely unaware of the authentic security token having been compromised. As such, the owner will likely also be completely unaware of the malicious party's ability to impersonate the owner using the cloned security token. As shown in FIGS. 2 and 3, computing device 202 may represent an authentic security token that is authorized to generate one-time-use security codes from shared secret 210, and cloned security token 208 may represent a computing device that is authorized to generate one-time-use security codes from shared secret 210.

As will be described in greater detail below, one or more of modules 102 from FIG. 1 may, when executed by at least one processor of computing device 202 and/or server 206, enable computing device 202 and/or server 206 to detect cloning of security tokens. For example, and as will be described in greater detail below, one or more of modules 102 may cause computing device 202 and/or server 206 to (i) log, at computing device 202, one-time-use security codes (e.g., one-time-use security code 214) that are derived at computing device 202 from shared secret 210 to log 120, (ii) log, at server 206, one-time-use security codes (e.g., one-time-use security code 214 and one-time-use security code 216) that are derived from shared secret 210 and received at server 206 to log 122, (iii) determine that computing device 202 has been cloned (i.e., determine that cloned security token 208 exists) by determining that log 122 includes at least one additional one-time-use security code (e.g., one-time-use security code 216) that is not included in log 120, and (iv) perform a security action in response to determining that computing device 202 has been cloned. In the example configuration illustrated in FIG. 2, computing device 202 and/or server 206 may determine that log 122 includes at least one additional one-time-use security code (e.g., one-time-use security code 216) that is not included in log 120 by transmitting, from server 206, published log 126 that may include any suitable representation of the information contained in log 122. In this example, determining module 108 may cause computing device 202 to determine that computing device 202 has been cloned by determining that published log 126 includes at least one additional one-time-use security code (e.g., one-time-use security code 216) that is not included in log 120.

In the example configuration illustrated in FIG. 3, computing device 202 and/or server 206 may determine that log 122 includes at least one additional one-time-use security code (e.g., one-time-use security code 216) that is not included in log 120 by transmitting, from computing device 202 to server 206, reported log 124 that may include any suitable representation of the information contained in log 120. In this example, determining module 108 may cause server 206 to determine that computing device 202 has been cloned by determining that log 122 includes at least one additional one-time-use security code (e.g., one-time-use security code 216) that is not included in reported log 124.

Figure 4:
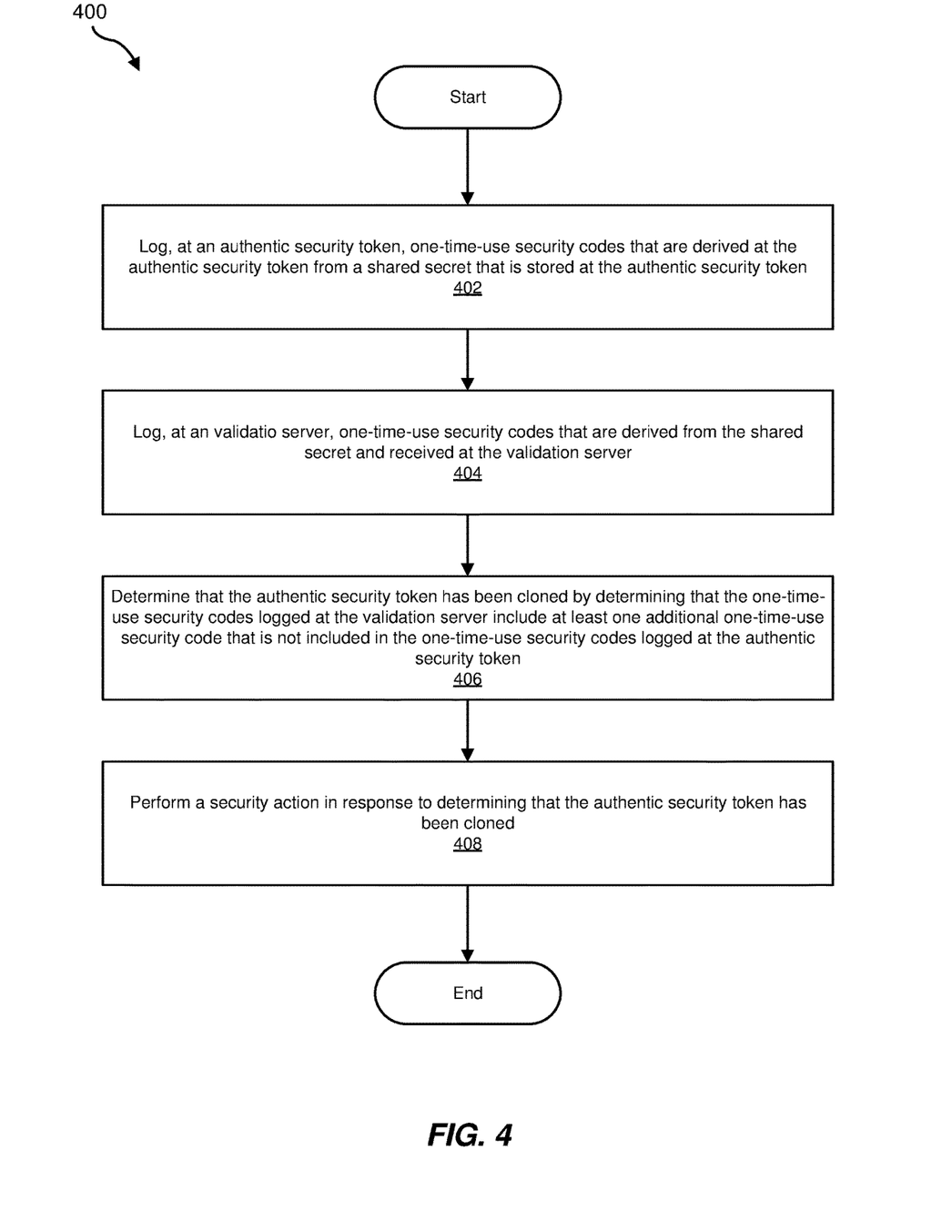
FIG. 4 is a flow diagram of an example method for detecting cloning of security tokens.

FIG. 4 is a flow diagram of an example computer-implemented method 400 for detecting cloning of security tokens. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may log, at an authentic security token, one-time-use security codes that are derived at the authentic security token from a shared secret that is stored at the authentic security token. For example, client-side logging module 104 may, as part of computing device 202 in FIG. 2, log one-time-use security code 214 that was derived at computing device 202 from shared secret 210.

The systems described herein may perform step 402 in any suitable manner. In general, client-side logging module 104 may log one-time-use security codes that are derived at an authentic security token by recording any information about the one-time-use security codes and/or their derivation that may be used to later identify the one-time-use security codes. For example, in response to detecting the derivation of a one-time-use security code, client-side logging module 104 may record the actual value of the one-time-use security code, a hashed value for the one-time-use security code, a timestamp that indicates when the one-time-use security code was derived, accessed, and/or transmitted from the authentic security token, and/or a hashed value for such a timestamp.

In some examples, an authentic security token may derive one-time-use security codes in response to a request from a user for the one-time-use security codes. In such situations, client-side logging module 104 may log each one-time-use security code that is provided to the user in response to such a request. Additionally or alternatively, an authentic security token may derive one-time-use security codes that a user of the authentic security token never sees, accesses, or uses. In such circumstances, client-side logging module 104 may log only those one-time-use security codes that have been known to have been seen, accessed, or used by a user.

At step 404, one or more of the systems described herein may log, at a validation server, one-time-use security codes that are derived from the shared secret and received at the validation server. For example, server-side logging module 106 may, as part of server 206 in FIG. 2, log one-time-use security codes 214 and 216 that were derived from shared secret 210 and received by server 206 from computing device 202 and cloned security token 208, respectively.

The systems described herein may perform step 404 in any suitable manner. In general, server-side logging module 106 may log one-time-use security codes that are received by a validation server by recording any information about the one-time-use security codes, their derivation, and/or their validation that may be used to later identify the one-time-use security codes, their derivation, and/or their validation. For example, in response to receiving a one-time-use security code, server-side logging module 106 may record the actual value of the one-time-use security code, a hashed value for the one-time-use security code, a timestamp that indicates when the one-time-use security code was derived at a security token, received at a validation server, and/or validated by a validation server, and/or a hashed value for such a timestamp. In some examples, server-side logging module 106 may also log information about a received one-time-use security code that may be used to identify the source of the one-time-use security code (e.g., an Internet-Protocol (IP) address or a location of the authentic security token from which the one-time-use security code was received) and/or any transaction information associated with the one-time-use security code.

At step 406, one or more of the systems described herein may determine that the authentic security token has been cloned by determining that the one-time-use security codes logged at the validation server include at least one additional one-time-use security code that is not included in the one-time-use security codes logged at the authentic security token. For example, determining module 108 may, as part of computing device 202 in FIG. 2 and/or server 206 in FIG. 3, determine that computing device 202 has been cloned by determining that the one-time-use security codes logged at server 206 include at least one additional one-time-use security code (e.g., one-time-use security code 216) that is not included in the one-time-use security codes logged at computing device 202.

The systems described herein may perform step 406 in any suitable manner. In general, determining module 108 may compare information about the one-time-use security codes logged at a validation server with information about the one-time-use security codes logged at an authentic security token to identify any discrepancies that may indicate that the authentic security token has been cloned. For example, determining module 108 may determine that an authentic security token has been cloned by determining that a one-time-use security code logged at the validation server was not logged at the authentic security token, by determining that a hash of a one-time-use security code logged at the validation server does not match a hash of a one-time-use security code logged at the authentic security token, by determining that a timestamp associated with a one-time-use security code logged at the validation server does not match an associated timestamp of a one-time-use security code logged at the authentic security token, any of which may indicate that the one-time-use security code was received from a cloned security token.

In one example, determining module 108 may determine that an authentic security token has been cloned as part of an application installed on the authentic security token. In this example, determining module 108 may request, from a validation server that validates one-time-use security codes derived at the authentic security token, information that identifies the one-time-use security codes that were received at the authentic security token and validated using a shared secret that is known by the authentic security token and the validation server. In some examples, a validation server may publish, for each shared secret that is known to the validation server, a log of the one-time-use security codes that were derived from the shared secret and received by the validation server. In some examples, the validation server may publish, in encrypted or unencrypted form, the one-time-use security codes themselves, hashes of the one-time-use security codes, timestamps that indicate when the one-time-use security codes were derived and/or received at the authentic security token, and/or hashes of such timestamps. In some examples, the validation server may secure access to any security-code logs by requiring a valid one-time-use security code that was derived from an associated shared secret.

Additionally or alternatively, determining module 108 may determine that an authentic security token has been cloned as part of a validation server that validates one-time-use security codes for the authentic security token. In this example, determining module 108 may request and/or receive, from an authentic security token, information that identifies the one-time-use security codes that were derived at the authentic security token. In some examples, an authentic security token may periodically transmit a log of the one-time-use security codes that were derived at the authentic security token. In some examples, the authentic security token may transmit, in encrypted or unencrypted form, the one-time-use security codes themselves, hashes of the one-time-use security codes, timestamps that indicate when the one-time-use security codes were derived and/or accessed at the authentic security token, and/or hashes of such timestamps.

At step 408, one or more of the systems described herein may perform a security action in response to determining that the authentic security token has been cloned. For example, security module 110 may, as part of computing device 202 and/or server 206 in FIG. 2, perform a security action in response to determining that computing device 202 has been cloned.

The systems described herein may perform step 408 in any suitable manner. For example, in response to determining that an authentic security token has been cloned, security module 110 may invalidate any shared secrets that are associated with the authentic security token so that a cloned security token can no longer be used to perform authentication or payment validation functions. In some examples, security module 110 may notify an interested party of an authentic security token having been cloned. For example, security module 110 may inform an owner of the authentic security token that his or her authentic security token and/or an associated account of the owner may have been compromised. Additionally or alternatively, security module 110 may inform a payment network that payment transactions associated with an authentic security token may have been fraudulent. In at least one example, security module 110 may record any information about the one-time-use security codes that have recently been received from a cloned security token that may be used to identify and/or investigate the malicious party responsible for the cloned security token. Upon completion of step 408, exemplary method 400 in FIG. 4 may terminate.

As explained above, by comparing (i) the one-time-use security codes that are derived at an authentic security token from a shared secret that is stored at the authentic security token and known to a validation server with (ii) the one-time-use security codes that are derived from the shared secret and validated by the validation server, the systems and methods described herein may detect a discrepancy that indicates that (i) the authentic security token may have been cloned and (ii) a malicious party may be using a cloned security token to impersonate an owner of the authentic security token.

Figure 5:
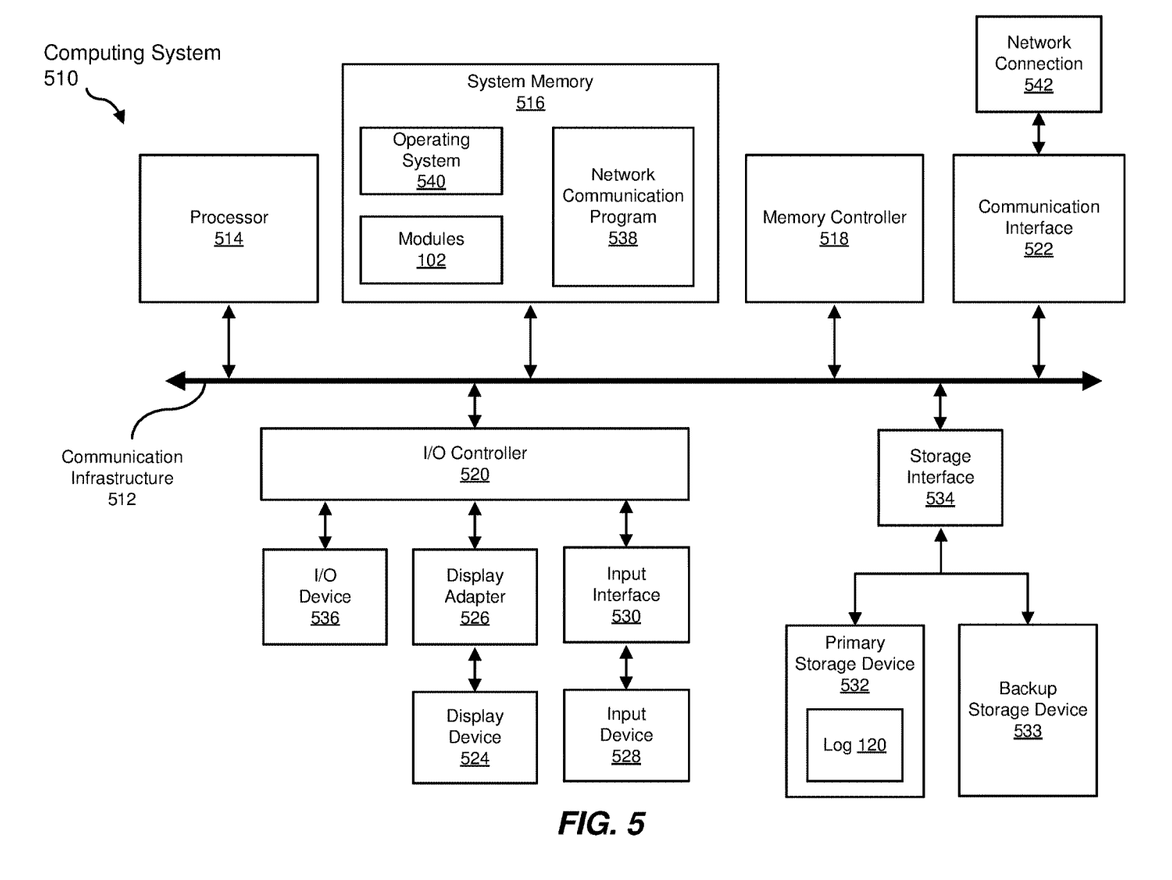
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 4). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, one or more of logs 120, 122, 124, and 126 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
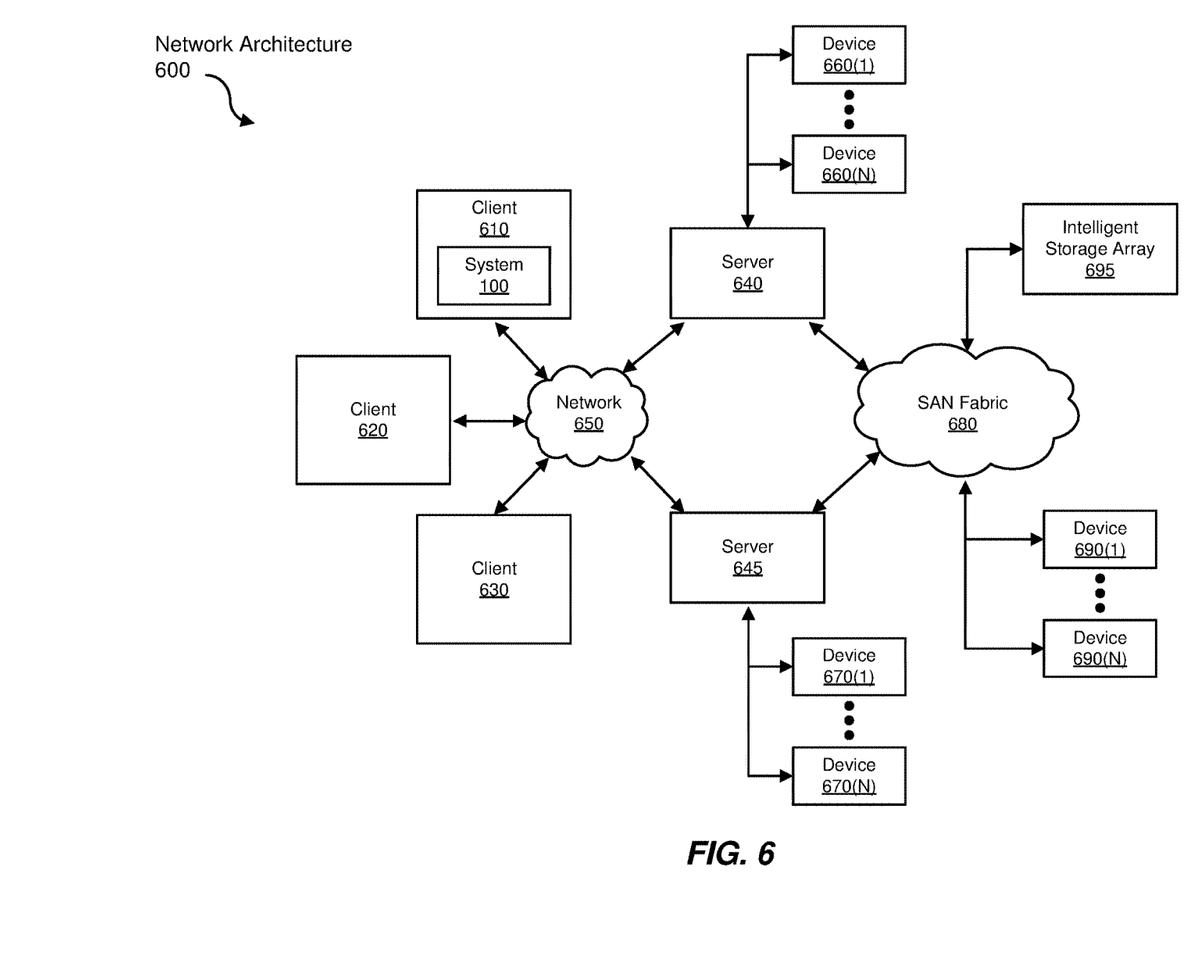
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 4). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting cloning of security tokens.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive (i) a client-side log of the one-time-use security codes that have been derived at an authentic security token from a shared secret that is stored at the authentic security token and (ii) a server-side log of one-time-use security codes that have been derived from the shared secret and received at the validation server, transform the client-side log and the server-side log into a determination that the authentic security token has been cloned, output a result of the transformation to a security system, use the result of the transformation to perform a security action, and store the result of the transformation to a system for storing the statuses of security tokens. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting cloning of security tokens, at least a portion of the method being performed by a computing device comprising at least one processor, the method comprising:

logging, at an authentic security token, one-time-use security codes that are derived at the authentic security token from a shared secret that is stored at the authentic security token, wherein the authentic security token is the only security token on which the shared secret is intended to be used to generate one-time-use security codes;

logging, at a validation server, one-time-use security codes that are derived from the shared secret and received at the validation server;

determining that the authentic security token has been cloned by determining that the one-time-use security codes logged at the validation server include at least one additional one-time-use security code that is not included in the one-time-use security codes logged at the authentic security token; and performing a security action in response to determining that the authentic security token has been cloned.

2. The computer-implemented method of claim 1, further comprising transmitting, from the authentic security token to the validation server, a representation of the one-time-use security codes logged at the authentic security token, wherein the step of determining that the authentic security token has been cloned is performed at the validation server.

3. The computer-implemented method of claim 2, wherein the representation of the one-time-use security codes logged at the authentic security token comprises the one-time-use security codes logged at the authentic security token.

4. The computer-implemented method of claim 2, wherein the representation of the one-time-use security codes logged at the authentic security token comprises a timestamp of each of the one-time-use security codes logged at the authentic security token.

5. The computer-implemented method of claim 1, further comprising transmitting, from the validation server to the authentic security token, a representation of the one-time-use security codes logged at the validation server, wherein the step of determining that the authentic security token has been cloned is performed at the authentic security token.

6. The computer-implemented method of claim 5, wherein the representation of the one-time-use security codes logged at the validation server comprises the one-time-use security codes logged at the authentic security token.

7. The computer-implemented method of claim 5, wherein the representation of the one-time-use security codes logged at the validation server comprises a timestamp of each of the one-time-use security codes logged at the authentic security token.

8. The computer-implemented method of claim 5, wherein the representation of the one-time-use security codes logged at the validation server comprises a hashed timestamp of each of the one-time-use security codes logged at the authentic security token.

9. The computer-implemented method of claim 1, wherein the one-time-use security codes comprise one-time passwords.

10. The computer-implemented method of claim 1, wherein the one-time-use security codes comprise payment-transaction-specific dynamic security codes.

11. The computer-implemented method of claim 1, wherein performing the security action comprises invalidating the shared secret.

12. The computer-implemented method of claim 1, wherein performing the security action comprises notifying an interested party of the authentic security token having been cloned.

13. A system for detecting cloning of security tokens, the system comprising:
  a client-side logging module, stored in memory, that logs, at an authentic security token, one-time-use security codes that are derived at the authentic security token from a shared secret that is stored at the authentic security token, wherein the authentic security token is the only security token on which the shared secret is intended to be used to generate one-time-use security codes;
  a server-side logging module, stored in memory, that logs, at a validation server, one-time-use security codes that are derived from the shared secret and received at the validation server;
  a determining module, stored in memory, that determines that the authentic security token has been cloned by determining that the one-time-use security codes logged at the validation server include at least one additional one-time-use security code that is not included in the one-time-use security codes logged at the authentic security token;
  a security module, stored in memory, that performs a security action in response to determining that the authentic security token has been cloned; and
  at least one physical processor that executes the client-side logging module, the server-side logging module, the determining module, and the security module.

14. The system of claim 13, wherein:
  the client-side logging module further transmits, from the authentic security token to the validation server, a representation of the one-time-use security codes logged at the authentic security token; and
  the validation server comprises the determining module.

15. The system of claim 13, wherein:
  the server-side logging module further transmits, from the validation server to the authentic security token, a representation of the one-time-use security codes logged at the validation server; and
  the authentic security token comprises the determining module.

16. The system of claim 15, wherein the representation of the one-time-use security codes logged at the validation server comprises the one-time-use security codes logged at the authentic security token.

17. The system of claim 15, wherein the representation of the one-time-use security codes logged at the validation server comprises a hashed timestamp of each of the one-time-use security codes logged at the authentic security token.

18. The system of claim 13, wherein the one-time-use security codes comprise at least one of:
  one-time passwords; and
  payment-transaction-specific dynamic security codes.

19. The system of claim 13, wherein performing the security action comprises performing at least one of:
  invalidating the shared secret; and
  notifying an interested party of the authentic security token having been cloned.

20. A non-transitory computer-readable medium comprising one or more computer-executable instructions that, when executed by at least one processor of a computing device, cause the computing device to:
  log, at an authentic security token, one-time-use security codes that are derived at the authentic security token from a shared secret that is stored at the authentic security token, wherein the authentic security token is the only security token on which the shared secret is intended to be used to generate one-time-use security codes;
  log, at a validation server, one-time-use security codes that are derived from the shared secret and received at the validation server;
  determine that the authentic security token has been cloned by determining that the one-time-use security codes logged at the validation server include at least one additional one-time-use security code that is not included in the one-time-use security codes logged at the authentic security token; and
  perform a security action in response to determining that the authentic security token has been cloned.

* * * * *